(12) United States Patent
Fedchenia (10) Patent No.: US 8,789,999 B2
(45) Date of Patent: Jul. 29, 2014

(54) ACOUSTIC ACCELERATION OF FLUID MIXING IN POROUS MATERIALS

(71) Applicant: United Technologies Corporation, Hartford, CT (US)

(72) Inventor: Igor I. Fedchenia, West Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 13/832,151

(22) Filed: Mar. 15, 2013

(65) Prior Publication Data

US 2013/0201781 A1      Aug. 8, 2013

Related U.S. Application Data

(62) Division of application No. 12/607,486, filed on Oct. 28, 2009, now Pat. No. 8,408,782, which is a division of application No. 11/507,691, filed on Aug. 22, 2006, now abandoned.

(51) Int. Cl.
*B01F 11/02*      (2006.01)

(52) U.S. Cl.
USPC ............................................ 366/114; 366/127

(58) Field of Classification Search
USPC ...................... 366/114, 115, 127, 275, DIG. 4
See application file for complete search history.

(56) References Cited

U.S. PATENT DOCUMENTS

| | | | |
|---|---|---|---|
| 1,751,087 A | 3/1930 | Jackson | |
| 1,774,896 A | 9/1930 | Miller | |
| 2,145,198 A | 1/1939 | Kiesskalt | |
| 2,578,377 A | 12/1951 | Smith | |
| 2,578,505 A | 12/1951 | Carlin | |
| 2,702,691 A | 2/1955 | Virmani | |
| 2,717,768 A | 9/1955 | Carpentier | |
| 2,831,785 A | 4/1958 | Kearney | |

(Continued)

FOREIGN PATENT DOCUMENTS

| | | |
|---|---|---|
| EP | 1892031 A1 | 2/2008 |
| JP | 35-14358 | 9/1935 |

(Continued)

OTHER PUBLICATIONS

Wikipedia—The Free Encyclopedia, "Ultrasonic sensors" [Online] pp. 1-2, XP002458015, Retrieved from the Internet: URL:http://en.wikipedia.org/wiki/Ultrasonic_transducer> retrieved on Nov. 9, 2007.

(Continued)

*Primary Examiner* — Charles E Cooley
(74) *Attorney, Agent, or Firm* — Bachman & LaPointe, P.C.

(57) ABSTRACT

Apparatus and methods are disclosed for uniformly mixing fluid phases entrained in a porous material. A mixer may have a vessel and at least one porous material held by the vessel. At least one actuator may be acoustically coupled with at least one wall of the vessel for generating a wave. The wave effects mixing of at least two fluids in the porous material. The actuator may be a linear motor actuated with a control signal of predetermined frequency. The actuator may have a number of actuator pairs each including respective first and second actuators at respective first and second sides of the vessel. The actuators may be hinged for reciprocal movement. The actuators may be actuated to form a compression expansion wave to effect fluid motion in the porous material.

23 Claims, 6 Drawing Sheets

(56) References Cited

U.S. PATENT DOCUMENTS

| | | | |
|---|---|---|---|
| 2,854,012 A | 9/1958 | Murdoch, Jr. | |
| 2,864,592 A | 12/1958 | Camp | |
| 2,874,316 A | 2/1959 | Murdoch, Jr. | |
| 2,876,083 A | 3/1959 | Prietl | |
| 2,891,176 A | 6/1959 | Branson | |
| 3,133,652 A | 5/1964 | Musschoot | |
| 3,301,535 A | 1/1967 | Brown | |
| 3,329,408 A | 7/1967 | Branson | |
| 3,368,610 A | 2/1968 | Kartluke et al. | |
| 3,385,570 A | 5/1968 | Pijls et al. | |
| 3,583,677 A | 6/1971 | Phillips | |
| 3,673,441 A | 6/1972 | Royster | |
| 3,804,329 A | 4/1974 | Martner | |
| 3,949,349 A | 4/1976 | Massa et al. | |
| 4,047,060 A | 9/1977 | Schafft | |
| 4,071,225 A | 1/1978 | Holl | |
| 4,078,210 A | 3/1978 | Lewis | |
| 4,140,936 A | 2/1979 | Bullock | |
| 4,168,295 A | 9/1979 | Sawyer | |
| 4,433,916 A | 2/1984 | Hall | |
| 4,705,980 A | 11/1987 | Mishiro | |
| 4,782,910 A | 11/1988 | Sims | |
| 4,949,316 A | 8/1990 | Katahara | |
| 4,956,149 A | 9/1990 | Kawana et al. | |
| 5,123,433 A | 6/1992 | Fridsma et al. | |
| 5,641,228 A | 6/1997 | Prokopenko | |
| 5,890,802 A | 4/1999 | Evensen et al. | |
| 5,956,293 A | 9/1999 | Rorick | |
| 6,515,030 B1 | 2/2003 | Bechtel et al. | |
| 6,744,176 B2 | 6/2004 | Dinger | |
| 6,910,797 B2 | 6/2005 | Falcon | |
| 6,986,601 B2 | 1/2006 | Sadler et al. | |
| 7,041,154 B2 | 5/2006 | Staroselsky et al. | |
| 7,622,510 B2 | 11/2009 | Arnaud | |
| 8,240,907 B2 * | 8/2012 | Gabl et al. | 366/127 |
| 8,408,782 B2 * | 4/2013 | Fedchenia | 366/114 |
| 2007/0002678 A1 | 1/2007 | Murakami | |
| 2008/0049545 A1 | 2/2008 | Fedchenia | |
| 2010/0046319 A1 * | 2/2010 | Fedchenia | 366/114 |
| 2011/0019497 A1 * | 1/2011 | Kotera et al. | 366/116 |
| 2011/0028703 A1 | 2/2011 | Hollenstein et al. | |
| 2013/0201781 A1 * | 8/2013 | Fedchenia | 366/114 |

FOREIGN PATENT DOCUMENTS

| | | |
|---|---|---|
| JP | 63020026 A | 1/1988 |
| JP | 5-220371 | 8/1993 |
| JP | 10-504066 A | 4/1998 |
| JP | 2003-111453 | 4/2003 |
| JP | 2003265939 A | 9/2003 |
| JP | 2006087984 A | 4/2006 |
| JP | 2007014957 A | 1/2007 |
| WO | 96/00318 A2 | 1/1996 |
| WO | 2007063314 A | 6/2007 |

OTHER PUBLICATIONS

Wikipedia—The Free Encyclopedia, "Piezoelectricity" [Online] pp. 1-10, XP002458016, Retrieved from the Internet: URL:http://en.wikipedia.org/wiki/Piezoelectricity> retrieved on Nov. 9, 2007.

Wikipedia—The Free Encyclopedia, "Linear actuator" [Online] pp. 1-5, XP002458017, Retrieved from the Internet: URL:http://en.wikipedia.org/wiki/Linear_actuator> retrieved on Nov. 9, 2007.

European Search Report for EP Patent Application No. 07253229.4, dated Nov. 28, 2007.

JP Office Action for Japanese Patent Application No. JP2007-212539, dated Mar. 2, 2010.

US Office Action for U.S. Appl. No. 12/607,486, dated Jul. 25, 2012.

* cited by examiner

ACOUSTIC ACCELERATION OF FLUID MIXING IN POROUS MATERIALS

CROSS-REFERENCE TO RELATED APPLICATIONS

This is a divisional of Ser. No. 12/607,486, filed Oct. 28, 2009, and entitled "Acoustic Acceleration of Fluid Mixing in Porous Materials", issued on Apr. 2, 2013 as U.S. Pat. No. 8,408,782 which is a divisional application of Ser. No. 11/507,691, filed Aug. 22, 2006, and entitled "Acoustic Acceleration of Fluid Mixing in Porous Materials" (abandoned), the disclosures of which are incorporated by reference herein in its entirety as if set forth at length.

BACKGROUND OF THE INVENTION

The invention relates generally to the field of combining fluids. More specifically, the invention relates to apparatus and methods for uniformly mixing fluid phases entrained in a porous medium.

The mixing of fluids is frequently needed to perform chemical reactions. Most chemical reactions require a controlled and homogeneous mixing of reagents.

A conventional means of mixing two or more miscible liquids is mechanical manipulation to stir and exploit fluidic forces to produce localized regions corresponding to relatively high fluid flow rates. The flow rates operate to produce localized turbulent forces within the fluid field. The turbulence provides a contact surface between the liquids such that diffusion of the fluid components into each other produces a homogeneous mixture.

Mixing also includes homogeneous compositions of immiscible fluids such as oil and air, typically used in oil jet pumps for gear lubrication. Oil and air are not miscible in a chemical sense, but may be combined in a mechanical sense. The term frequently used for mixing immiscible substances is homogenization.

Ultrasonic mixers use piezoelectric transducers to generate vibrations. High power output may be required to maintain the desired amplitude and intensity under conditions of increased load such as high viscosity or immiscibility.

When a porous medium, such as a polymer membrane, is used to contain reagents, equilibrium diffusion is problematic. While ultrasonic mixers have been employed to provide bulk mixing of liquid and gas, they have not been successfully employed for porous materials. Typically, the only known approach for mixing intensification inside porous bodies has been mechanical manipulation which might not be feasible or desirable in every case.

What is desired is a controlled acceleration of mixing in porous media. This would result in smaller physical component packaging for synthesizing units housing porous media such as those used for chemical reactors, fuel cells, and the like.

SUMMARY OF THE INVENTION

Although there are various types of mechanical manipulation mixing apparatus, such mixers are not completely satisfactory for porous media. The inventor has discovered that it would be desirable to have apparatus and methods for uniformly mixing fluid phases entrained in porous media.

One aspect of the invention provides a porous material mixer. Mixers according to this aspect of the invention comprise a vessel. At least one porous medium/material is held by the vessel. At least one actuator is acoustically coupled with at least one wall of the vessel for generating a wave. There is at least one inlet in the vessel for admitting at least two fluids for combining, wherein the wave effects mixing of the at least two fluids in the at least one porous material.

Another aspect of the invention is a method for mixing at least two fluids in a porous material. Methods according to this aspect begin with introducing the fluids into porous material held by a mixing vessel, the mixing vessel comprising at least one inlet, at least one linear motor coupled to at least one actuator wherein the actuator is acoustically coupled to a wall of the vessel, exciting the at least one linear motor with a control signal of predetermined frequency, and forming a compression/expansion wave determined by the actuator acoustic coupling and the predetermined frequency wherein fluid motion in the porous material within the vessel is effected.

The details of one or more embodiments of the invention are set forth in the accompanying drawings and the description below. Other features, objects, and advantages of the invention will be apparent from the description and drawings, and from the claims.

DETAILED DESCRIPTION

Embodiments of the invention will be described with reference to the accompanying drawing figures wherein like numbers represent like elements throughout. Further, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. The terms "mounted," "connected," and "coupled" are used broadly and encompass both direct and indirect mounting, connecting, and coupling. Further, "connected" and "coupled" are not restricted to physical or mechanical connections or couplings.

The invention is an apparatus and method for uniformly mixing together at least two fluids, or reagents, in viscous or gaseous phases, either miscible or immiscible, in a porous medium. The invention may be used for any application that requires uniformly mixing fluids.

Figure 1:
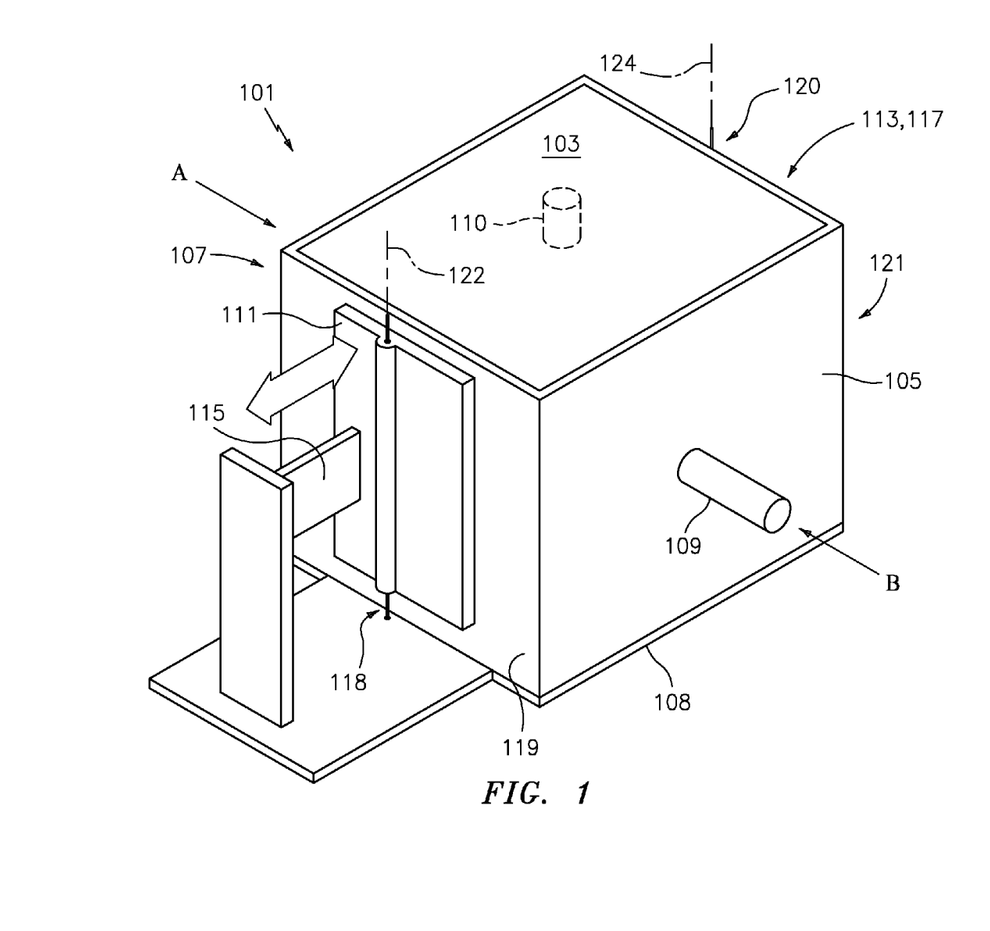
FIG. 1 is a perspective view of an exemplary ultrasonic porous media mixer with a top cover removed.

Shown in FIG. 1 is a mixer 101 for combining reagents introduced into a porous media 103. The mixer 101 comprises at least one porous medium 103, such as a porous ceramic used for oxidizing toxic waste, a fluidized bed with catalyst or palladium-coated metal membranes for generating hydrogen, a silica-alumina membrane for dehydrating isopropyl alcohol or synthesizing dimethyl carbonate from carbon dioxide and methanol, a symmetrical hydrophobic nylon 66 membrane for adsorbing enzymes, and other media, contained in a rigid vessel 105. The vessel may be made from materials that transmit acoustic waves and are compatible with the fluids to be mixed, such as but not limited to stainless steel, ceramics, plastics and others. The exemplary embodiment is shown as a cubic volume, however, other vessel shapes and configurations may be used according to the mixer application and teachings of the invention.

The preferred embodiment has two inlets 107, 109 for admitting reagents A and B to mix together as they interact with the porous media 103. Two outlets 108, 110 are provided and may be positioned perpendicular to the inlets 107, 109. In the exemplary embodiment, the inlets 107, 109 and outlets 108, 110 are located on opposing sides of the vessel 105. However, the inlets 107, 109 and outlets 108, 110 may be located on adjacent sides, or on the same side of the vessel 105, or in any other suitable arrangement.

Located on opposite sides of the vessel are actuators 111, 113 that translate a linear motion from at least one linear motor, such as a piezoelectric transducer 115, 117 into a controlled compression/expansion wave to effect mixing in the porous media 103. The piezoelectric transducer(s) 115, 117 may be, for example, interdigitated electroded actuators, oriented multilayer-multifilament stacked piezoelectric composites, piezoelectric wafer actuators, or others. In embodiments, the transducers 115, 117 produce a deformation, or linear excursion in a range of from about 1 to 20% of the porous layer width, which may be in a range from about 0.1 microns to 1.0 cm dependent on the technological task when excited by a variable magnitude control signal. The vessel internal volume may contain one mono-layer, a sandwich of more than one type of porous media, or may be completely filled with more than one type of porous media. When a control signal of fixed or variable frequency is impressed, the transducer may vibrate from audible to ultrasonic frequencies. The frequency range may be in a range of from about 10 kHz to 100 MHz. The piezoelectric transducers 115, 117 may be electrically coupled to a variable frequency oscillator for excitation (not shown).

Deformation of a piezoelectric transducer plate generally corresponds to a motion along the axis normal to the plate. For interdigitated electroded actuators, which are typically rectangular, the excursion is in the longitudinal direction. The embodiment shown in FIG. 1 uses interdigitated electroded actuators.

Since the porous medium 103 is flexible in three dimensions, at least two sidewalls 119, 121 of the vessel 105 exhibit an acoustical impedance that allow for a controlled waveform to be impressed into the porous medium 103. In the preferred embodiment, the transducers 115, 117 are coupled to a stationary support and to the actuators 111, 113. A transducer 115, 117 excursion is transferred to a respective actuator 111, 113 which may be hinged in/by/at a hinge 118, 120 allowing for reciprocal movement about a hinge axis 122, 124.

Figure 2:
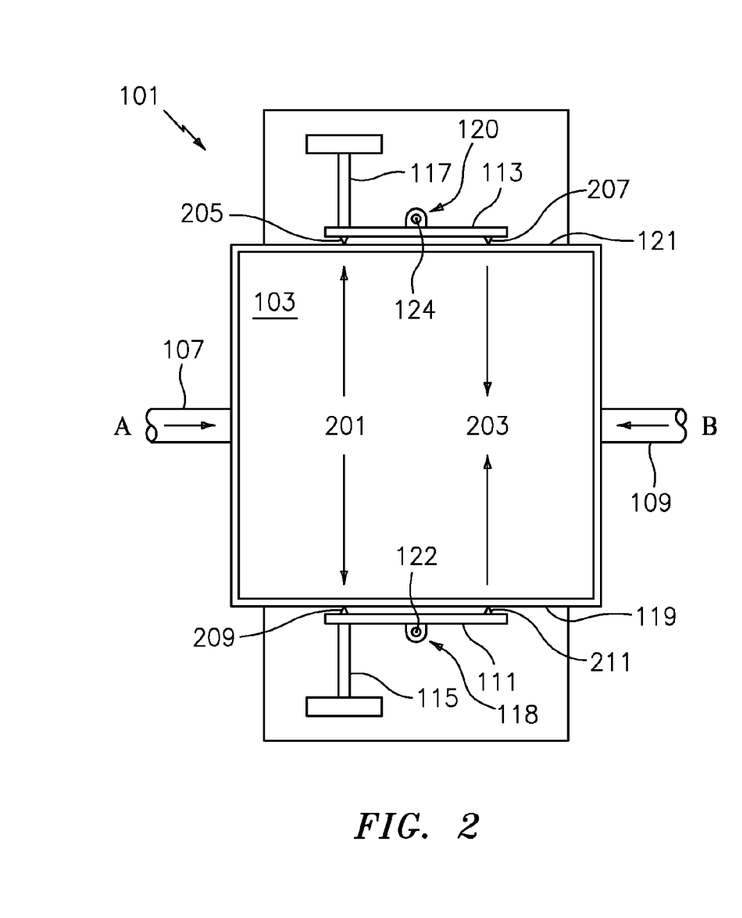
FIG. 2 is a plan view of the ultrasonic mixer of FIG. 1 in a first position.
Figure 3:
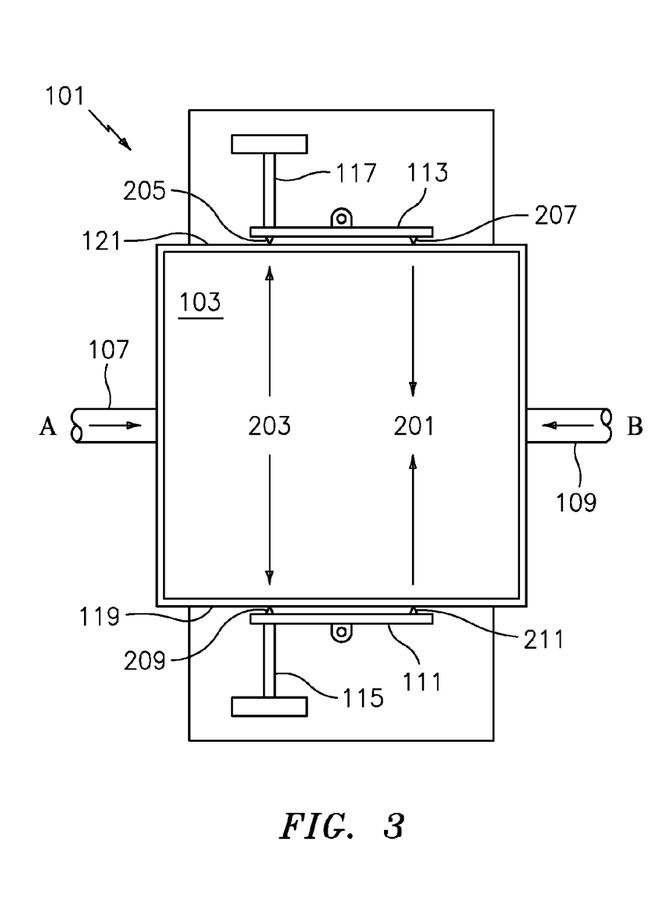
FIG. 3 is a plan view of the ultrasonic mixer of FIG. 1 in a second position.

Shown in FIG. 2 is a view of the mixer 101 with two transducers 115, 117 where a compression wave 203 is applied to one half of the porous media and a reciprocal expansion wave 201 to the other half of the porous media. FIG. 3 shows the alternating nature of the applied force when the transducers 115, 117 are at a positive excursion. Each actuator 111, 113 alternately imparts a compression 203/expansion 201 wave. Each transducer 115, 117 excitation is in unison with each other.

The actuators 111, 113 transfer the linear excursion from the transducers 115, 117 into a compression 203/expansion 201 wave indirectly to the porous media 103 via the sidewalls 119, 121. Each actuator employs at least two acoustic coupling points 205, 207, 209, 211 separated by a predefined distance corresponding to the actuator 111, 113. The points 205, 207, 209, 211 provide and act as the point source of acoustical energy from the transducers 115, 117 to the porous media 103.

Figure 4:
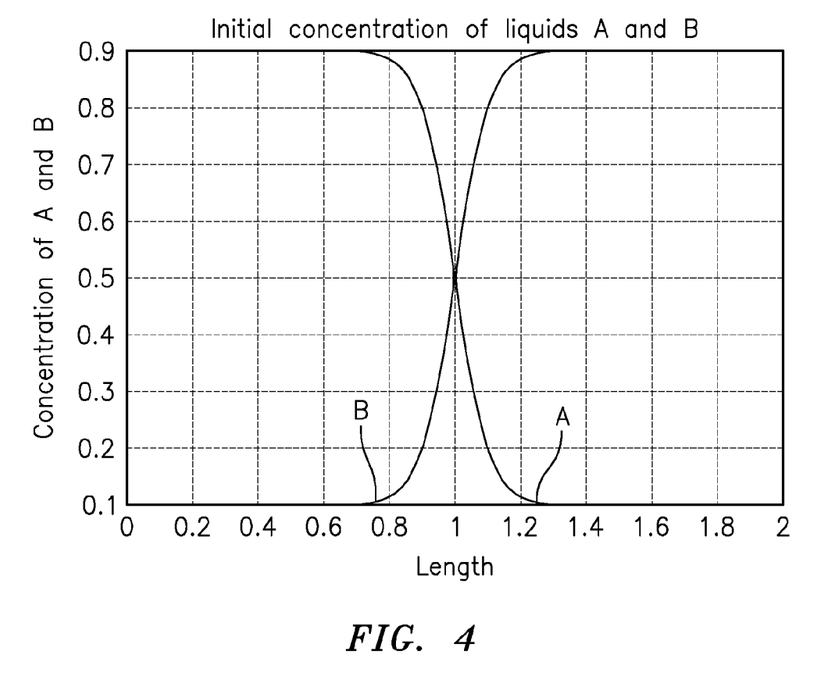
FIG. 4 is a plot showing an initial distribution of two immiscible fluids in the porous media.

Shown in FIG. 4 is a plot of initial reactant location within the mixer 101. The initial concentrations of reactants A and B are located at their respective inlet 107, 109 sides of the mixer. The plot shows gradual diffusion at the vessel 105 midpoint with no vibration. They slowly diffuse inwards toward the middle of the porous media. The reactant A slowly diffuses into the volume occupied by the reactant B and vise versa such that the concentrations of A and B reach equilibrium values about ½ way uniformly across the vessel. The dimensions of the mixer are as required to achieve the desired productivity.

Figure 5:
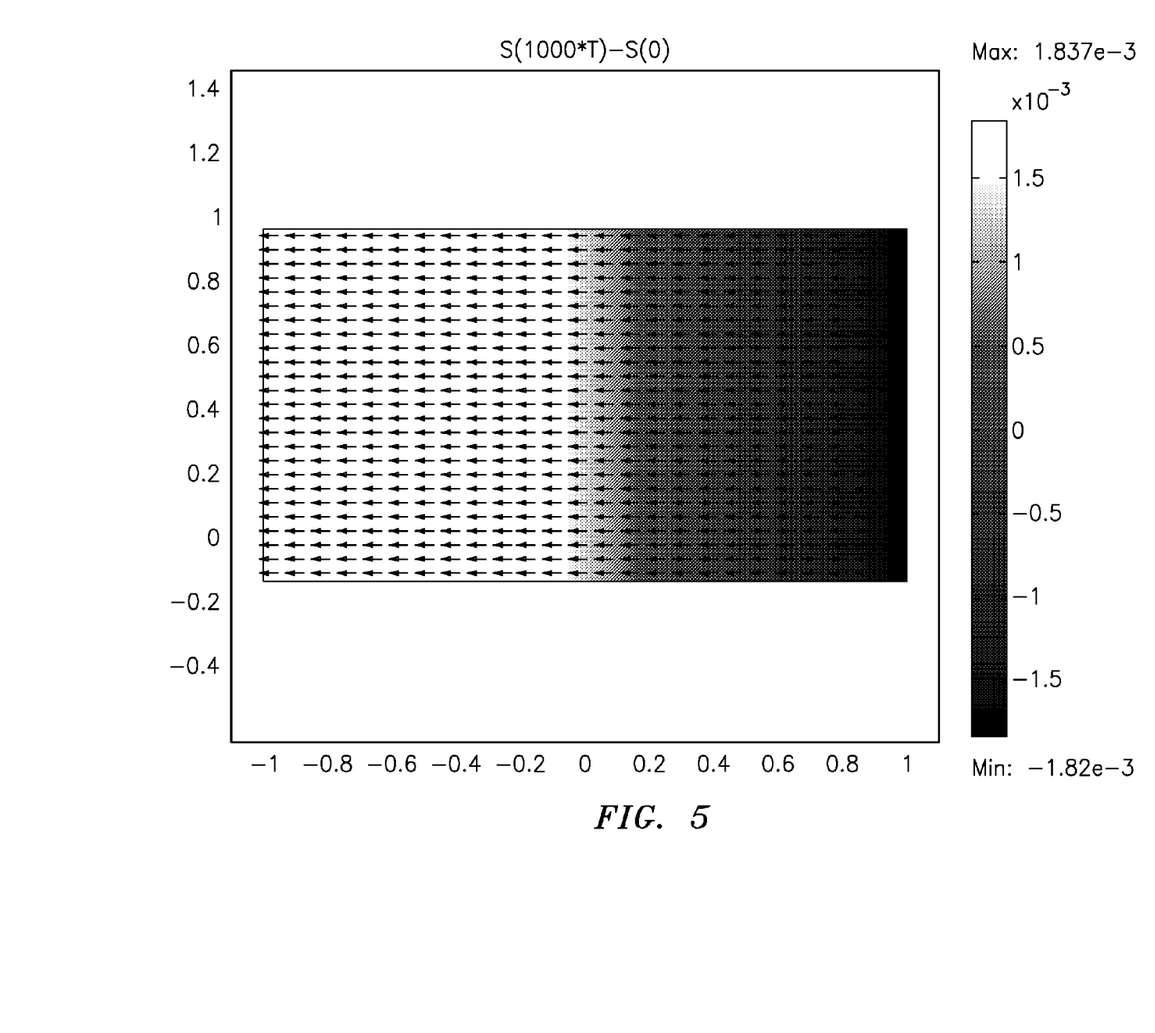
FIG. 5 is a plot showing the direction of liquid A inside the porous media without any acoustic wave applied.

The plot of FIG. 5 shows gradual diffusion at the vessel 105 midpoint with no vibration. The fluids slowly diffuse inwards toward the middle of the porous media. The reactant A slowly diffuses into the volume occupied by the reactant B and vise versa such that the concentrations of A and B reach equilibrium values about ½ way uniformly across the vessel 105. The dimensions of the mixer are as required to achieve the desired productivity.

Figure 6:
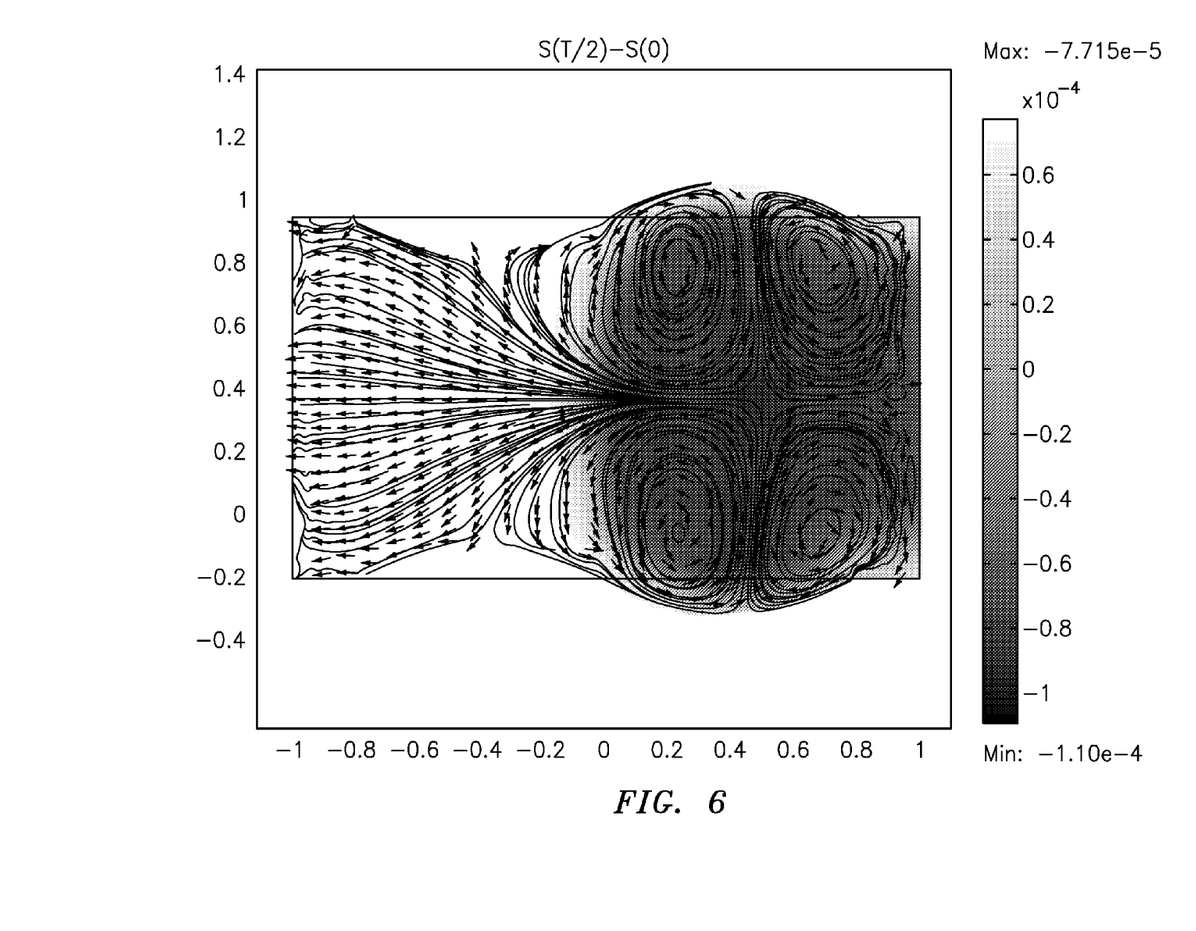
FIG. 6 is a plot showing the concentration of FIG. 5 and direction of liquid A using the mixer according to the invention.

Shown in FIG. 6 is a plot showing the same reactant concentrations as in FIG. 5, with the compression/expansion wave applied by the invention 101 frozen in time. The transducers 115, 117 are excited using a frequency of 10 MHz. The plot shows enhanced mixing of the reactants when the compression/expansion wave is applied, with no additional mechanical manipulation.

The parameters of the porous medium 103 shown in FIGS. 5 and 6 are those of Torrey paper. Torrey paper is a porous material used in fuel cell applications. Porosity is a non-dimensional quantity being the ratio of free space to the total volume of the material. The concentration change toward equilibration in the porous media 103 is calculated as $1.8*10^{-7}$ per one period of vibration. The value indicates that during the time equal to one vibration period, the concentration in non-dimensional units (the ratio of the volume occupied by A or B to the total volume) has changed by $1.8*10^{-7}$. The value 0.00000018 is small, however, the period, $$V=1/t, \qquad (1)$$

where V is the frequency and t is the period, of a 10 MHz vibration is very short and substantial changes in concentration may be reached in the short time for frequencies of 10 MHz and higher.

FIG. 6 shows the concentration change toward equilibrium in the porous media 103 when using the mixer 101 as $0.4*10^{-5}$ per one period of vibration. With this invention, mixing acceleration is approximately 22 times greater for a chosen porous media using a 10 MHz excitation having an amplitude equal to 0.1 of the sample width. In other words, by applying a 10 MHz vibration with an amplitude equal to 1/10 of the vessel thickness, the concentration change towards equilibrium is approximately 22 times faster than without the vibration (ratio of $0.4*10^{-5}$ to $1.8*10^{-7}$).

The acoustic perturbation of the porous material 103 using the compression/expansion wave of the invention accelerates the mixing of the reactants to more than 20 times that of natural diffusion. Multiphase flow in the porous medium 103 when subjected to the compression/expansion wave show dramatic enhancement of mixing compared to natural diffusion of the two reacting fluids inside the porous sample.

Figure 7:
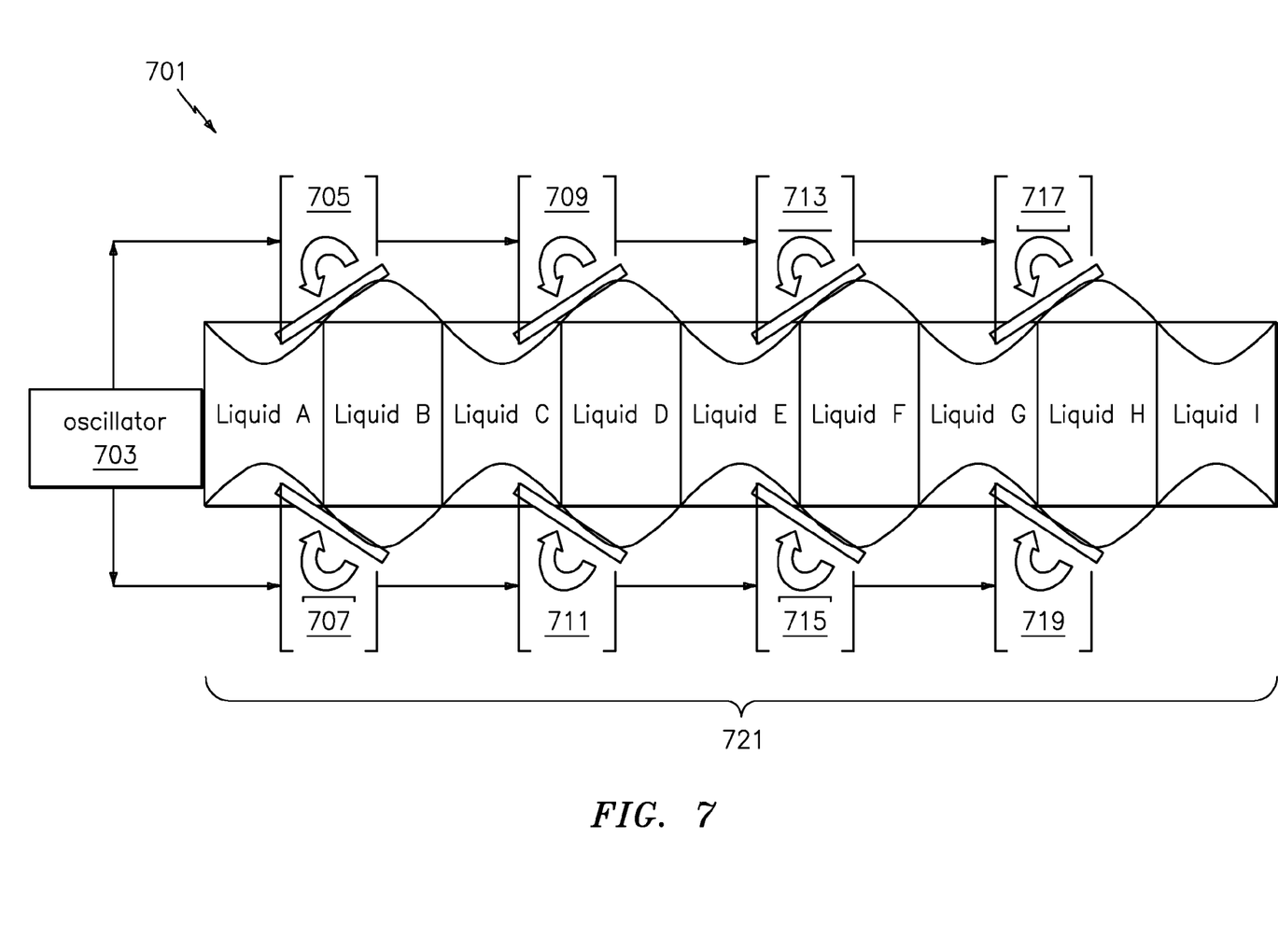
FIG. 7 is an exemplary alternative embodiment.

The exemplary embodiment shown in FIG. 1 is one instance of the general approach to accelerating and controlling the mixing of at least two reactants inside at least one porous medium. Shown in FIG. 7 is an alternate embodiment of the invention 701. The alternative embodiment employs 4 pairs of transducer/actuators 705, 707, 709, 711, 713, 715, 717, 719.

The wave imparted by the transducer/actuators 705, 707, 709, 711, 713, 715, 717, 719 exert force on two opposing surfaces of at least one porous medium 721 containing, at an initial stage, separate liquids A through I introduced through a micro-channel plenum (not shown). The motion of the invention is synchronized such that each transducer excursion is in unison. Transducer/actuators 705, 709, 713, 717 and 707, 711, 715, 719 may be a lower and an upper part of the same transducer assembly, respectively. This means that the transducers that exert force synchronously may be designed as one entity, as N/2, rather than requiring N separate transducers (one transducer for each actuator), such that one source of ultrasonic energy is divided and channeled to the required point sources of application by which synchronization is achieved.

Modifications to the acoustic perturbation wave shape applied to the porous medium and to the frequency may be used to optimize the rate of mixing in any porous medium structure geometry. Moreover, hybridization of the transducer syncing may further optimize mixing efficiency, where each pair of transducer/actuators 705/707, 709/711, 713/715, 717/719 may not be in complete synchronicity, or phase, with other pairs, but with each operating at a predetermined phase shift from other pairs.

In other representative and exemplary applications, various embodiments of the invention may be employed, for example, to mix methanol and water in a reformed hydrogen fuel cell and/or a direct methanol fuel cell. Additionally, various embodiments of the invention have demonstrated the capability to mix a variety of fluids including, for example, gases, liquids, gas-liquid mixtures, etc. Other representative applications may include the mixing of fuels supplying a micro-reactor and/or micro-combustion chamber.

One or more embodiments of the present invention have been described. Nevertheless, it will be understood that various modifications may be made without departing from the spirit and scope of the invention. Accordingly, other embodiments are within the scope of the following claims.

What is claimed is:

1. A mixer comprising:
a vessel;
at least one porous material held by the vessel;
at least one actuator acoustically coupled with at least one wall of said vessel for generating a wave; and
at least one inlet in said vessel for admitting to said porous material at least two fluids for combining, wherein said wave effects mixing of said at least two fluids in the at least one porous material.

2. The mixer according to claim 1 further comprising a linear motor coupled to said actuator wherein, when excited by a control signal, said motor exhibits an excursion.

3. The mixer according to claim 2 wherein:
said excursion applies a force against said actuator;
said excursion and said actuator acoustic coupling shapes said wave;
said actuator acoustic coupling is provided by at least two points separated by a predefined distance;
said force is coupled through said vessel wall into said at least one porous material; and
said actuator is hinged to pivot about a hinge axis so as to alternately apply force to each said point on opposite sides of said hinge axis.

4. The mixer according to claim 2 wherein said excursion applies a force against said actuator.

5. The mixer according to claim 4 wherein said excursion and said actuator acoustic coupling shapes said wave.

6. The mixer according to claim 1 wherein said actuator acoustic coupling is provided by at least two points separated by a predefined distance.

7. The mixer according to claim 6 wherein said force is coupled through said vessel wall into said at least one porous material.

8. The mixer according to claim 7 wherein said actuator alternately applies force to each said point.

9. The mixer according to claim 8 wherein said linear motor is a piezoelectric transducer.

10. The mixer according to claim 9 wherein said excitation control signal alternates at a frequency in a range of from about 1 to 20 MHz.

11. The mixer according to claim 10 wherein a difference between alternate force applications corresponds to about 180 degrees.

12. The mixer according to claim 11 wherein said wave within said at least one porous material is a compression/expansion wave that corresponds with said alternate force applications.

13. The mixer according to claim 12 wherein said at least one porous material is one mono-layer.

14. The mixer according to claim 12 wherein said at least one porous material is a sandwich of more than one type of porous material.

15. The mixer according to claim 1 further comprising:
at least one outlet.

16. The mixer according to claim 1 wherein:
the at least one inlet comprises a first inlet for admitting a first of the at least two fluids and a second inlet for admitting the second of the at least two fluids.

17. The mixer according to claim 1 wherein:
the porous material has a first side and a second side opposite the first side; and
the at least one actuator comprises a plurality of pairs of actuators, each pair having a first actuator along the first side and a second actuator along the second side.

18. A porous material mixer comprising:
a vessel for holding at least one porous material;
a plurality of actuator pairs, wherein each actuator pair comprises two member actuators and each actuator pair member is acoustically coupled with an opposing side of said vessel for generating a wave; and
at least one inlet in said vessel for admitting to the porous material at least two fluids for combining, wherein said wave effects mixing of said at least two fluids.

19. The mixer according to claim 18 wherein each pair of actuators further comprises a linear motor wherein, when excited by a control signal, said motor exhibits an excursion.

20. The mixer according to claim 19 wherein said excursion applies a force against each actuator pair member.

21. The mixer according to claim 20 wherein said excursion and said actuator pair member acoustic coupling shapes said wave.

22. The mixer according to claim 18 further comprising:
at least one outlet.

23. The mixer according to claim 18 wherein:
the at least one inlet comprises a first inlet for admitting a first of the at least two fluids and a second inlet for admitting the second of the at least two fluids.

* * * * *